United States Patent
Wang et al.

(10) Patent No.: US 10,387,059 B2
(45) Date of Patent: Aug. 20, 2019

(54) MEMORY-DRIVEN OUT-OF-BAND MANAGEMENT

(71) Applicant: Hewlett Packard Enterprise Development LP, Houston, TX (US)

(72) Inventors: Zhikui Wang, Fremont, CA (US); Andy Brown, Houston, TX (US); Stephen B. Lyle, Granite Bay, CA (US); Dejan S. Milojicic, Palo Alto, CA (US); Chandrasekar Venkatraman, Saratoga, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 57 days.

(21) Appl. No.: 15/329,936

(22) PCT Filed: Jan. 30, 2015

(86) PCT No.: PCT/US2015/013882
§ 371 (c)(1),
(2) Date: Jan. 27, 2017

(87) PCT Pub. No.: WO2016/122631
PCT Pub. Date: Aug. 4, 2016

(65) Prior Publication Data
US 2017/0262209 A1    Sep. 14, 2017

(51) Int. Cl.
*G06F 12/00* (2006.01)
*G06F 3/06* (2006.01)
(Continued)

(52) U.S. Cl.
CPC .......... *G06F 3/0629* (2013.01); *G06F 3/0604* (2013.01); *G06F 3/0653* (2013.01); *G06F 3/0688* (2013.01); *G06F 12/084* (2013.01); *G06F 12/1072* (2013.01); *G06F 13/1663* (2013.01); *G06F 15/167* (2013.01)

(58) Field of Classification Search
CPC .... G06F 3/0629; G06F 3/0604; G06F 3/0653; G06F 3/0688; G06F 3/0689; G06F 13/1663; G06F 12/084; G06F 12/1072
See application file for complete search history.

(56) References Cited

U.S. PATENT DOCUMENTS 6,148,377 A * 11/2000 Carter ................... G06F 9/5016
                                                707/E17.12
8,171,174 B2   5/2012 Lambert et al.
(Continued)

OTHER PUBLICATIONS

International Searching Authority, The International Search Report and the Written Opinion, PCT/US2015/013882, dated Jun. 30, 2015, 10 Pages.

(Continued)

*Primary Examiner* — Shawn X Gu
(74) *Attorney, Agent, or Firm* — Hewlett Packard Enterprise Patent Department

(57) ABSTRACT

According to an example, memory-driven OOB management may include OOB management of a computing node of a plurality of computing nodes. The OOB management may be executed independent of an OS of the computing node. A memory fabric may be used to provide for shared access to a plurality of NVM nodes by the plurality of computing nodes.

17 Claims, 9 Drawing Sheets

(51) Int. Cl.
*G06F 12/084* (2016.01)
*G06F 12/1072* (2016.01)
*G06F 13/16* (2006.01)
*G06F 15/167* (2006.01)

(56) References Cited

U.S. PATENT DOCUMENTS

| | | |
|---|---|---|
| 8,321,616 B2 | 11/2012 | Lambert et al. |
| 8,850,132 B1 | 9/2014 | Dhavale et al. |
| 2005/0257213 A1 | 11/2005 | Chu et al. |
| 2010/0043006 A1 | 2/2010 | Oakes et al. |
| 2013/0159449 A1 | 6/2013 | Taylor et al. |
| 2014/0208133 A1 | 7/2014 | Gopal et al. |
| 2014/0281629 A1* | 9/2014 | Bose .................. G06F 1/3228 713/323 |
| 2014/0304718 A1 | 10/2014 | Gambardella et al. |
| 2014/0365549 A1 | 12/2014 | Jenkins |

OTHER PUBLICATIONS

Kant ~ "Data center evolution a tutorial on state of the art, issues, and challenges" ~ Computer Networks ~ 2009 ~ 27 pages.

* cited by examiner

500

RECEIVE, FROM A SYSTEM MANAGER, CONFIGURATION INFORMATION RELATED TO OUT-OF-BAND (OOB) MANAGEMENT OF A COMPUTING NODE OF A PLURALITY OF COMPUTING NODES
502

IMPLEMENT THE OOB MANAGEMENT OF THE COMPUTING NODE BASED ON THE CONFIGURATION INFORMATION
504

ACCESS A MEMORY FABRIC TO STORE AND RETRIEVE DATA RELATED TO THE OOB MANAGEMENT OF THE COMPUTING NODE RESPECTIVELY TO AND FROM A NON-VOLATILE MEMORY (NVM) RESOURCE POOL PROVIDED BY A PLURALITY OF NVM NODES
506

FIG. 5

MEMORY-DRIVEN OUT-OF-BAND MANAGEMENT

BACKGROUND

In computer systems, a service processor may be used to monitor the physical state of a computer, network server, or other hardware devices using sensors. The service processor often communicates monitoring statistics with a system administrator through an independent connection.

BRIEF DESCRIPTION OF DRAWINGS

Features of the present disclosure are illustrated by way of example and not limited in the following figure(s), in which like numerals indicate like elements, in which:

FIG. 5 illustrates further details of the method for memory-driven OOB management, according to an example of the present disclosure.

DETAILED DESCRIPTION

Figure 1A:
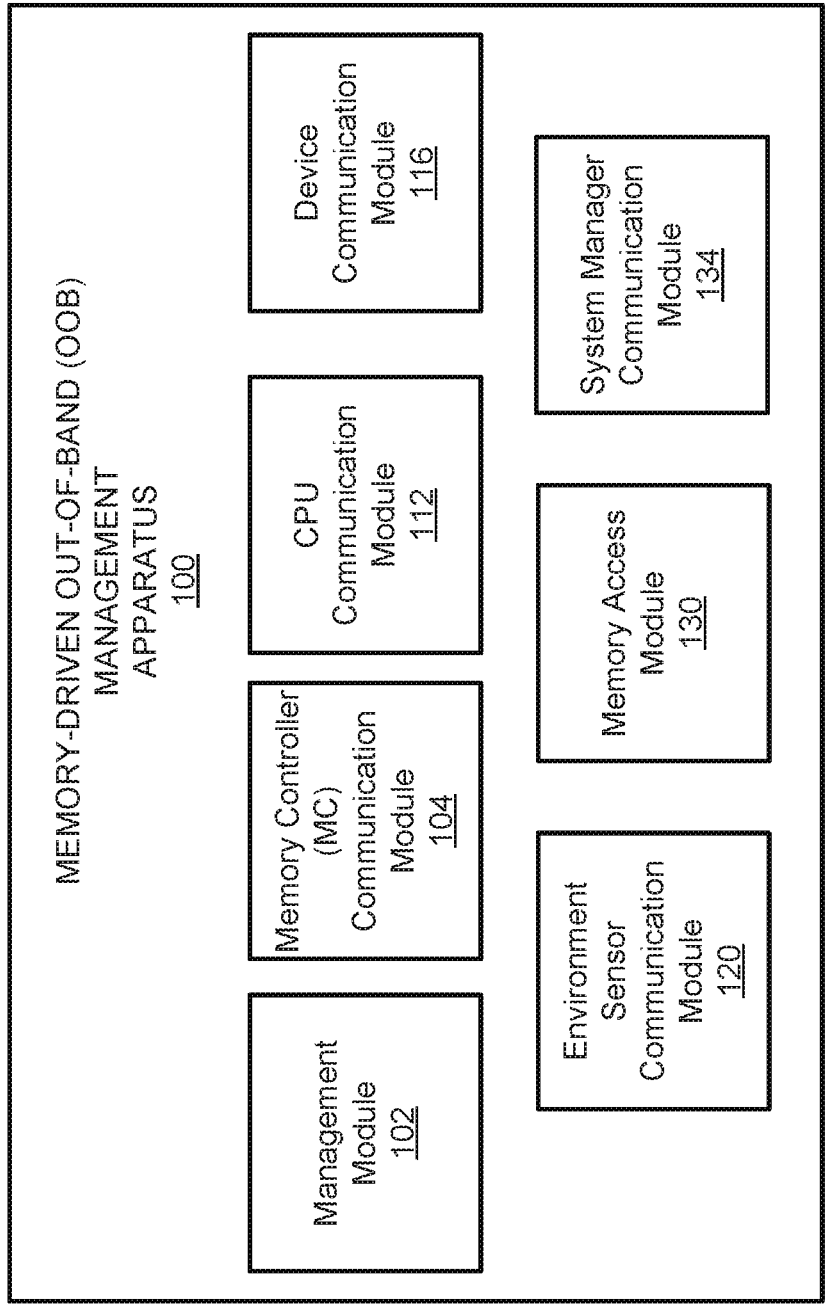
FIG. 1A illustrates an architecture of a memory-driven out-of-band (OOB) management apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A baseboard management controller (BMC) of computing, storage, or networking systems may include its own power provisioning, computing capacity, local storage, external access channels such as Ethernet, and its own machine readable instructions. The BMC is a type of service processor that may support management tasks such as inventory (e.g., identification (ID), version number, etc.), of hardware and machine readable instructions components, such as chipsets, drivers for input/output (I/O), etc.), logging (e.g., information related to transactions, errors, etc.), configuration (e.g., right to make changes to a main system), and monitoring (e.g., power, temperature, state, etc., of a main system). The BMC may operate independently of a main system and data streams related to the main system. External data, such as firmware and operating system (OS) images, may be loaded into local storage through Ethernet before the external data may be applied to the main system. The BMC may collect data from the components that are being managed by the BMC, and save the data in local storage. When a higher-layer management controller, such as a system manager or an analysis engine, needs the data that is being collected by the BMC, the higher-layer management controller may need to obtain the data through an Ethernet channel connected to the BMC.

Limitations exist with this BMC architecture. For example, the BMC may include limited computing capacity, a relatively small capacity with respect to local storage, a relatively low networking bandwidth, and a relatively high degree of security needs. Generally these constraints may be due to the need to keep the BMC cost low, as the BMC is an extra infrastructure for a computing system, and does not contribute to execution of primary workloads. These limitations may constrain the capability and scalability of the BMC. For example, a local storage may be limited to saving real-time BMC related data for a short time period due to the relatively small size, BMC related data may be loaded into a system manager in a batch mode to reduce the usage of bandwidth, BMC related data may not be available if the BMC fails, BMC related data stored in the local stores of computing nodes may have to be copied for diagnosis, etc.

An out-of-band (OOB) management system may operate with hardware resources and components that are independent of the operating system (OS). These resources may be dedicated to systems management and may allow management of system hardware components independent of their states. These resources may be available when the OS is unavailable, and may interact with the OS.

Alternatively, an in-band management system may be used to take advantage of a main system's relatively large storage capacity, relatively high communication bandwidth, and relatively high performance. In-band management may operate with the support of hardware components that are needed for and used by the OS. An example of an in-band management system may include a general purpose network interface controller (NIC) available through the OS.

In-band management may allow a portion of a disk to be used for permanent storage, and the machine readable instructions related to in-band management may take a relatively small fraction of performance away from the workload for infrastructure cycles. In-band management may be relatively complicated to create and maintain over a relatively large, heterogeneous population of hardware and OS's given the need to load unique machine readable instructions with knowledge of the particular hardware onto any particular OS that may execute on a main system. Moreover, an in-band management may not be available when a main system fails and is difficult to communicate with while a main system is being deployed.

In order to address the aforementioned aspects, according to examples, a memory-driven OOB management apparatus and a method for memory-driven OOB management are disclosed herein. The apparatus and method disclosed herein may utilize a relatively high bandwidth and relatively high capacity memory fabric of a data-centric infrastructure that hosts a relatively large number of computing cores and a relatively large size of non-volatile memory (NVM) resource pool.

For the apparatus and method disclosed herein, the memory fabric may provide for a central processing unit (CPU) or a plurality of CPUs to access pools of memory (e.g., NVM) in a shared manner, using store and retrieve semantics. For example, the memory fabric may allow a plurality of independent compute node boards with memory to access all of the memory on all the boards within a main system in a shared manner. Generally, the memory fabric may provide for the sharing of memory between a plurality of nodes, where the nodes may be computing node (CNs) as described herein, NVM nodes as described herein, or a combination of CNs and NVM nodes, or other types of nodes. Together with the NVM, the apparatus and method disclosed herein may provide distributed and flexible systems management with relatively high computing, storage, and networking capacity.

The apparatus and method disclosed herein may utilize the memory fabric to reduce the need for an extra, OOB fabric. The apparatus and method disclosed herein may utilize remote persistent memory (e.g., NVM) as both memory and data storage. The apparatus and method disclosed herein may provide for larger and/or more frequent data collection (e.g., due to size, bandwidth, and availability). Further, the apparatus and method disclosed herein may facilitate sharing and updating of data, and provide for relatively high-bandwidth and low-latency communication with agents.

The apparatus and method disclosed herein may provide for management of a main system by using the existing workload data path and the large-capacity storage of the main system, while not utilizing cycles from the main system with in-band infrastructure management machine readable instructions. Further, for the apparatus and method disclosed herein, the functions or data that are collected may be configured or federated, and the apparatus disclosed herein may operate both as a source and as a destination.

Figure 1B:
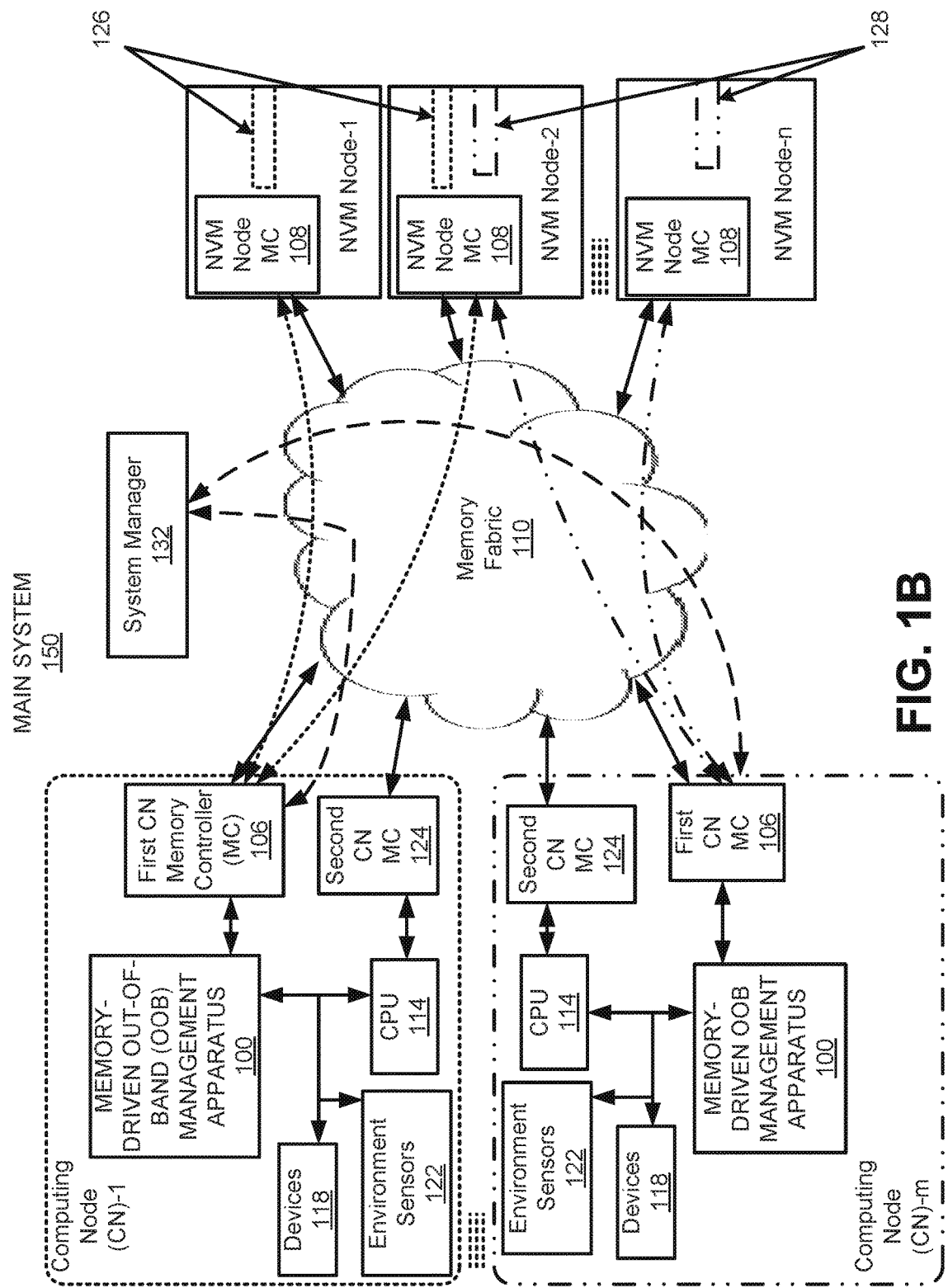
FIG. 1B illustrates an environment of the memory-driven OOB management apparatus, according to an example of the present disclosure.

FIG. 1A illustrates an architecture of a memory-driven OOB management apparatus (hereinafter also referred to as "apparatus 100"), according to an example of the present disclosure. FIG. 1B illustrates an environment of the apparatus 100, according to an example of the present disclosure. Referring to FIGS. 1A and 1B, the apparatus 100 may include a management module 102 to implement OOB management of a CN of a plurality of CNs 1-m. The OOB management of the CN may be executed independent of an OS of the CN. For example, the OOB management of the CN may be executed without the support of hardware components that are needed for and used by the OS of the CN. Moreover, the OOB management may utilize resources that are dedicated to systems management and allow management of system hardware components independent of their states.

A main system 150 for the apparatus 100 may include the plurality of CNs 1-m, and a plurality of NVM nodes 1-n that host a relatively large size of NVM (e.g., memristor). With respect to the CNs 1-m, each CN of the CNs 1-m may include an instantiation of the apparatus 100. Alternatively, one of the CNs 1-m may include the apparatus 100 that is utilized to manage the remaining CNs 1-m.

The apparatus 100 may include a memory controller (MC) communication module 104 to communicate with a first CN MC 106. The first CN MC 106 may be used to communicate with a NVM node MC 108 of a NVM node (of the NVM nodes 1-n) via a memory fabric 110.

The memory fabric 110 may be a high-bandwidth and low-latency memory fabric. The memory read-write requests from the CNs 1-m may be sent through the memory fabric 110 by the CN MCs, and received and processed by the NVM node MCs.

The apparatus 100 may further include a CPU communication module 112 to communicate with a CPU 114, a device communication module 116 to communicate with devices 118 that expose access to the apparatus 100 to support OOB management functions, and an environment sensor communication module 120 to communicate with environment sensors 122 such as temperature sensors, power meters, etc. A second CN MC 124 may be used for communication of the CN with the memory fabric 110.

For the example of FIG. 1B, associated blocks of NVM that are allocated to a specific instantiation of the apparatus 100 for NVM node-1 and NVM node-2 (of NVM nodes 1-n) are shown at 126. Further, associated blocks of NVM that are allocated to a specific instantiation of the apparatus 100 for the NVM node-2 and NVM node-n are shown at 128. Thus, the NVM regions 126 and 128 may be used by the specific instantiations of the apparatus 100 as described herein.

For the example of FIG. 1B, the NVM nodes 1-n may be alternatively disposed on a CN that includes the memory fabric, or separately from the CNs 1-m as shown in FIG. 1B.

With respect to the NVM nodes 1-n, the pool of NVM provided by the NVM nodes 1-n may be shared by the CNs 1-m through the memory fabric 110. The apparatus 100 may host the NVM pool that is shared by the CNs 1-m through storage and retrieval operations.

For high availability purposes, the NVM nodes 1-n may be provided in a fault zone different from the CNs 1-m so that the NVM pool of the NVM nodes 1-n is accessible even when the CNs fail. The memory fabric 110 may also provide for access to NVM on one system from multiple other systems (e.g., access to one NVM node from multiple other CNs, or access to an instantiation of the apparatus 100 from multiple other instantiations of the apparatus 100). To enable sharing of the NVM between the CNs 1-m, a NVM manager (not shown) may assign blocks of NVM (e.g., from a NVM node, or from multiple NVM nodes 1-n) to the CNs 1-m per requests from a CN of the CNs 1-m.

The apparatus 100 for each of the CNs 1-m may include both hardware and machine readable instructions, and may communicate with components on the CN. As disclosed herein, the apparatus 100 may include the CPU communication module 112 to communicate with the CPU 114, the device communication module 116 to communicate with devices 118 that expose access to the apparatus 100 to support OOB management functions, and the environment sensor communication module 120 to communicate with environment sensors 122 such as temperature sensors, power meters, etc. Low-speed buses may be used for the communication between the apparatus 100 and the individual components (e.g., the CPU, environment sensors, etc.). Examples of the low-speed buses may include I²C, JTag, etc. The apparatus 100 may support OOB functions such as inventory (e.g., ID, version number, etc., of hardware and machine readable instructions components, such as chipsets, drivers for I/O, etc.), logging (e.g., information related to transactions, errors, etc.), configuration (e.g., right to make changes to a main system), monitoring (e.g., power, temperature, state, etc., of the main system 150), etc.

According to an example, the apparatus 100 may utilize the memory fabric 110 to support access of a CN to a destination memory (e.g., a NVM node) through storage and retrieval operations. For example, the apparatus 100 may operate as a source of the memory fabric 110. The apparatus 100 may utilize a memory access module 130 to access the NVM of the NVM nodes 1-n, to thus operate as a source of the memory fabric 110. Through the memory fabric 110, the apparatus 100 may utilize blocks of NVM that may be distributed on multiple NVM nodes. If the apparatus 100 requests a block of the NVM, the block of the NVM may be designated to the apparatus 100. Thus, local storage of the apparatus 100 on the CNs 1-m may be reduced or even removed. Data (e.g., firmware and OS images) may be read (i.e., retrieved) from the NVM of the NVM nodes into the apparatus 100. The data (e.g., inventory, error logs, performance logs, etc.) that the apparatus 100 collects may be written to the NVM of the NVM nodes. Moreover, the NVM may also be written or read by a system manager 132. For example, the system manager 132 may store images into the NVM of the NVM nodes 1-n for deployment or update, or retrieve the log data out from NVM for analysis.

According to an example, the apparatus 100 may utilize the memory access module 130 to operate as a destination of the memory fabric 110 based on memory address assignment. With respect to the operation of the apparatus 100 as a destination of a memory operation, the apparatus 100 may be exposed as a memory target with a memory address that may be read and/or written by agents through the memory fabric 110. The other instantiations of the apparatus 100 (e.g., on other CNs), or system managers that operate at a higher layer may then access the local data for the apparatus 100. For example, in order to monitor the thermal status of the main system 150, temperature sensors may be installed with the CPU 114, memory dual in-line memory modules (DIMMs; not shown), voltage regulator (not shown), power supplies (not shown), etc. The sensor values may be collected by the apparatus 100, and read by other instantiations of the apparatus 100 (e.g., in other CNs) or the system manager 132 through storage and retrieval operations. The sensor values on multiple CNs may be aggregated through the memory fabric 110 by the apparatus 100 on one single CN, and then forwarded to the system manager 132 via a system manager communication module 134 through the memory fabric 110. Moreover, each sensor on a CN may operate as a destination with memory address assigned, and then configured and read by the system manager 132.

Figure 1C:
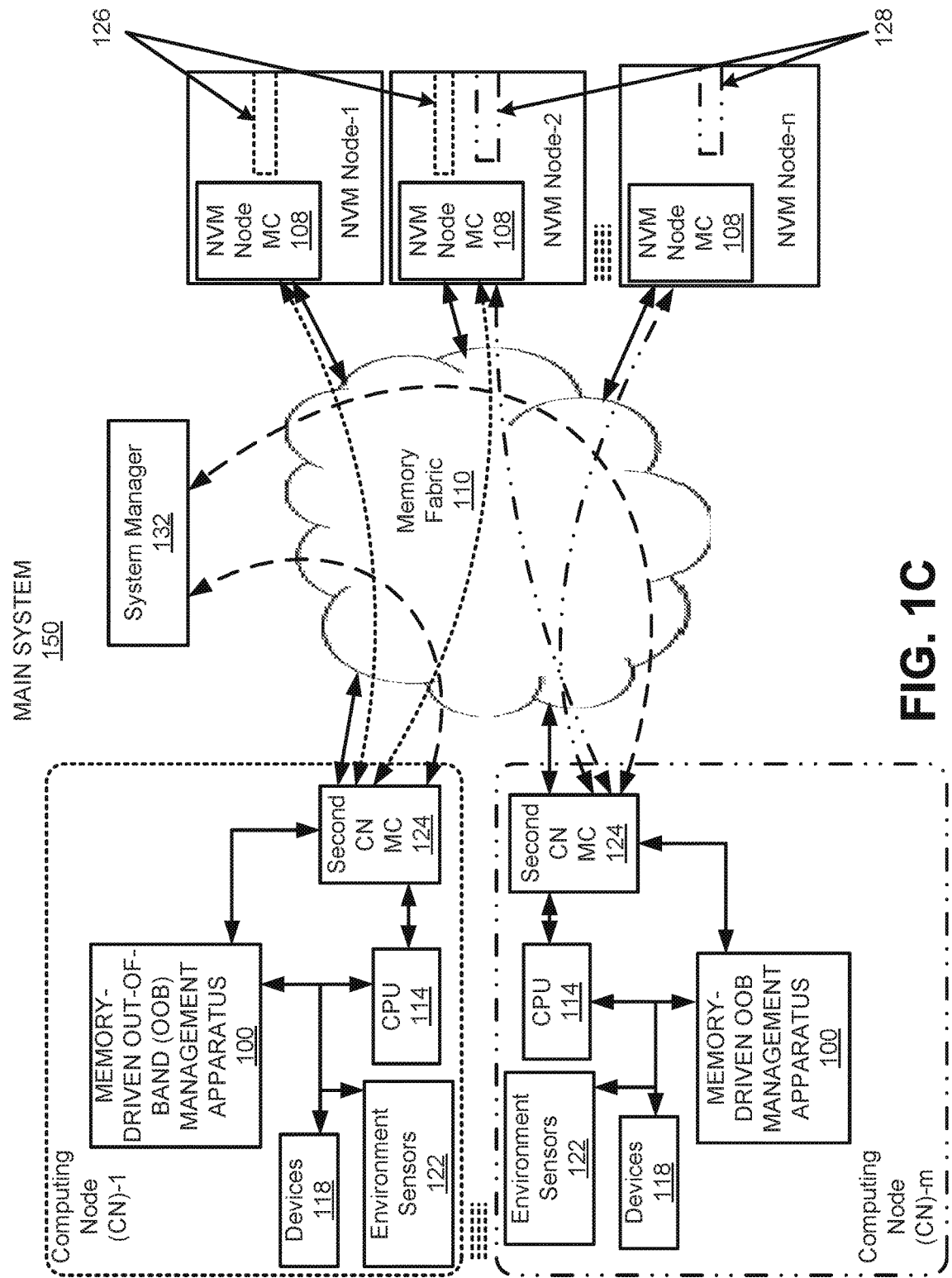
FIG. 1C illustrates sharing of an endpoint by the memory-driven OOB management apparatus, according to an example of the present disclosure.
Figure 1D:
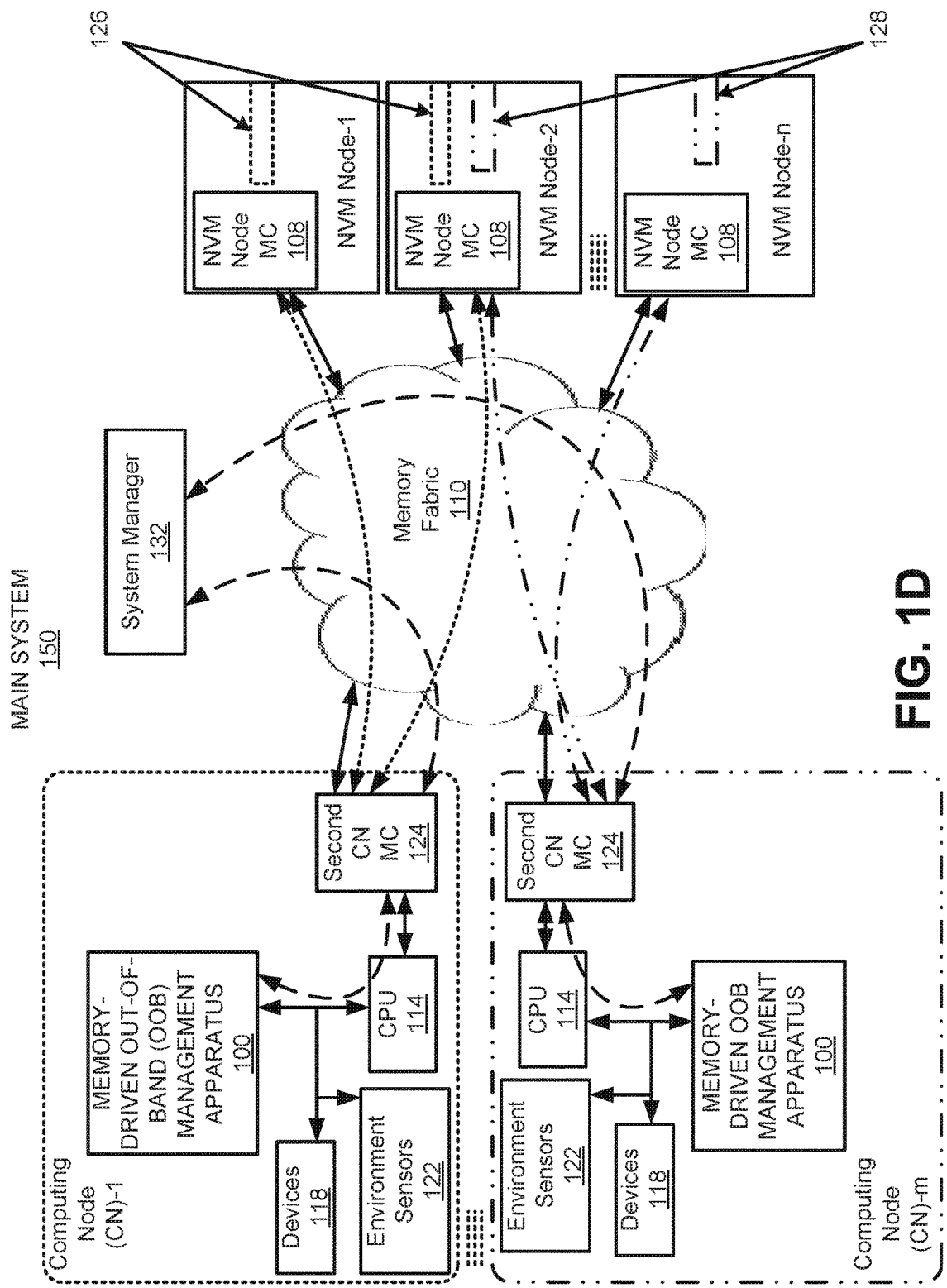
FIG. 1D illustrates utilization of a local system on chip (SoC) to execute machine readable instructions, according to an example of the present disclosure.

According to an example, the apparatus 100 may utilize the memory access module 130 to operate as either the source or the destination of the memory fabric 110. The apparatus 100 may host NVM (locally) that may be accessible by other agents through the memory fabric 110, for example, by using the first CN MC 106. As shown in FIG. 1B, the apparatus 100 may include its own memory fabric endpoint (e.g., the first CN MC 106) supported by hardware interfaces and machine readable instructions functions that may retrieve and store from and to the NVM nodes 1-n. As shown in FIG. 1C, the apparatus 100 may use low level transactions to share an endpoint (e.g., the second CN MC 124) in an application-specific integrated circuit (ASIC) in the CN, without interrupting or conflicting with workload traffic. For example, instead of the apparatus 100 including its own MC (e.g., the first CN MC 106), the apparatus 100 may share the second CN MC 124, without interrupting or conflicting with workload traffic. As shown in FIG. 1D, the apparatus 100 may cause the local system on chip (SoC) to execute machine readable instructions (e.g., via the CPU 114) that may get data related to the apparatus 100 to and from NVM of the NVM nodes 1-n. As shown in FIG. 1D, the apparatus 100 may also communicate, for example, via the CPU 114, with the OS on the CN. Thus, the apparatus 100 may use the NVM of the NVM nodes 1-n as memory, and the memory fabric 110 to access the NVM and/or other components such as the system manager 132. Thus, instead of having to go through the CPU 114 to access management data (or other data related to an application that is being executed), the apparatus 100 may directly access the NVM of the NVM nodes 1-n to access management data. This aspect of direct access to the NVM of the NVM nodes 1-n may simplify processing of the management data by the apparatus 100, as the CPU no longer needs to be interrupted and/or accessed to obtain the management data.

The ownership of the NVM of the NVM nodes 1-n may be built by a NVM manager (not shown) based on a request from the apparatus 100, per pre-configured policies, or as reserved in default. In order to initiate and maintain the ownership of the NVM of the NVM nodes 1-n, the apparatus 100 may include hardware interfaces (e.g., Ethernet, and machine readable instruction application programming interfaces (APIs) to communicate with the NVM manager).

In order to enable either transient or persistent memory space of the apparatus 100 accessible by other instantiations of the apparatus 100 (e.g., in other CNs) or the system manager 132 through the memory fabric 110, a global memory address may be assigned by the memory fabric 110, and the memory operation requests targeting the memory space may be transmitted to the instantiations of the apparatus 100 accordingly.

The machine readable instructions for the apparatus 100 may organize, store, and access the data on the NVM nodes 1-n. Examples of technologies that may be used by the machine readable instructions for the apparatus 100 for the data management through the store and retrieve memory fabric 110 may include, for example, in-memory database, in-memory key-value store, etc.

In order to configure the apparatus 100, the system manager 132 may configure the apparatus 100 as needed. For example, the system manager 132 may configure the apparatus 100 to collect a certain type of metric for a CN of the CNs 1-m, or for all of the CNs 1-m. According to another example, the system manager 132 may configure the apparatus 100 to collect a certain type of metric at a predetermined interval. Because of the high speed and low latency interconnect of the memory fabric 110, and the shared memory of the NVM nodes 1-n, the various instantiations of the apparatus 100 may be formed as a tightly coupled group, where the instantiations of the apparatus 100 in the group work in concert together towards a common task. For example, if the system manager 132 notices a correlated anomaly across a few CNs of the CNs 1-m (e.g., an application experiences much longer memory access latency across a few CNs of the CNs 1-m), the system manager 132 may focus all of the data collection on these CNs. In this way, the system manager 132 may operate as an agent (or a plurality of system managers may operate as agents) that may be distributed over the instantiations of the apparatus 100.

The operations of the apparatus 100 may be configured as needed in the real-time, with the needed parameters turned on and off as a function of the progress of the analytics executed on the system manager 132. For example, the data that the apparatus 100 collects may be changed, and the frequency of the data collection may be changed, some pre-analytics may be performed on the apparatus 100, etc.

An instantiation of the apparatus 100 may be implemented on an NVM node for management of the NVM node, in a similar manner as the CN. For example, an NVM node may also host computing capacity, e.g., a CPU, the apparatus 100, sensors, devices, etc.

Figure 2:
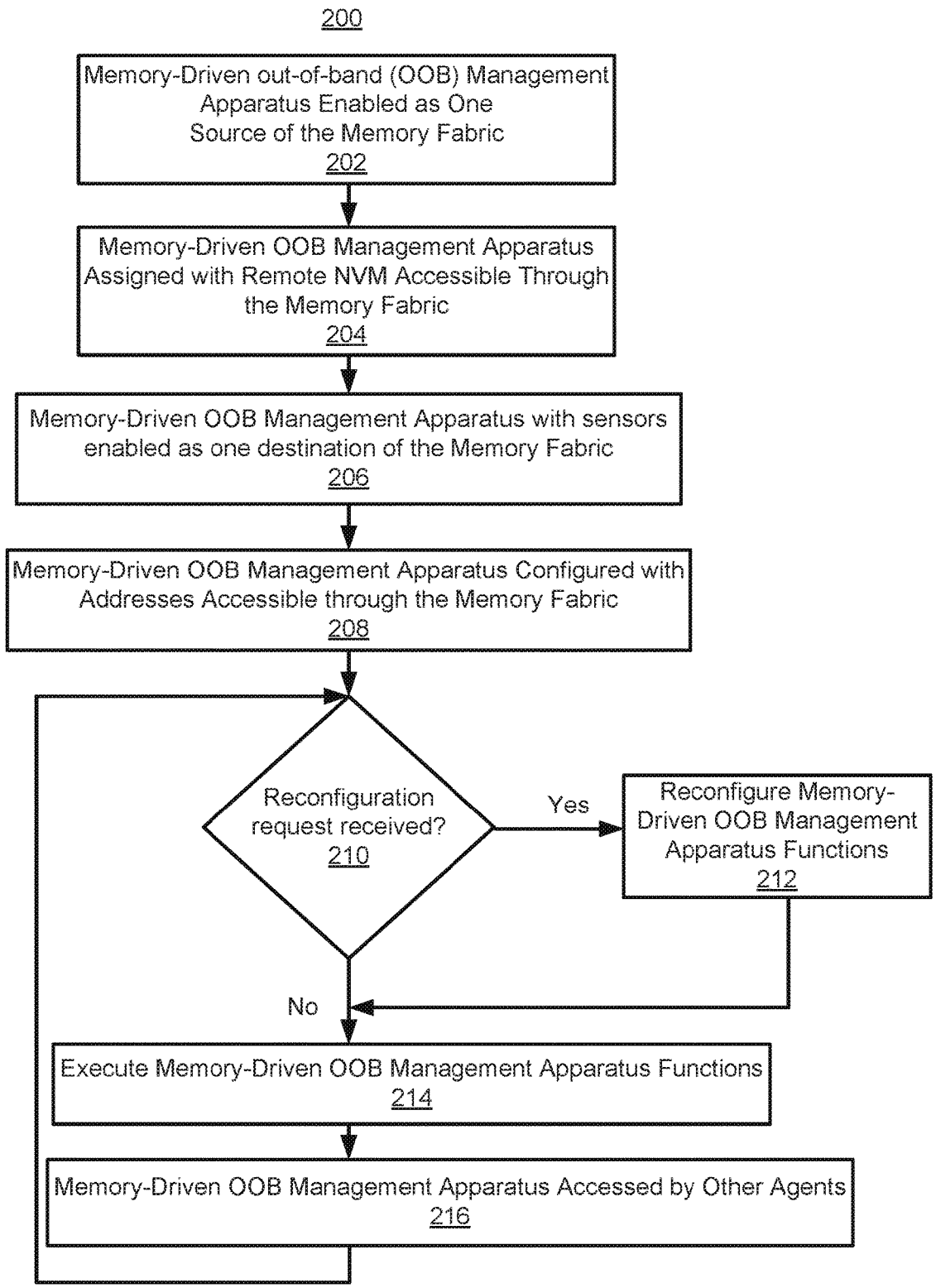
FIG. 2 illustrates a flowchart for the memory-driven OOB management apparatus of FIG. 1A, according to an example of the present disclosure.

FIG. 2 illustrates a flowchart 200 for the memory-driven OOB management apparatus of FIG. 1A, according to an example of the present disclosure.

Referring to FIG. 2, at block 202, the apparatus 100 may be enabled as a source of the memory fabric 110. For example, as described herein, the apparatus 100 may utilize the memory fabric 110 to support access of a CN to a destination memory (e.g., a NVM node) through storage and retrieval operations. The apparatus 100 may utilize the memory access module 130 to access the NVM of the NVM nodes 1-n, to thus operate as a source of the memory fabric 110.

At block 204, the apparatus 100 may be assigned with a remote NVM accessible through the memory fabric 110. For example, as described herein, data (e.g., firmware, OS images, or any machine readable instructions) may be retrieved from the NVM of the NVM nodes into the apparatus 100.

At block 206, the apparatus 100 may include sensors that enabled as a destination of the memory fabric 110. For example, as described herein, the apparatus 100 may utilize the memory access module 130 to operate as a destination of the memory fabric 110 based on memory address assignment.

At block 208, the apparatus 100 may be configured with addresses accessible through the memory fabric 110. For example, as described herein, the system manager 132 may configure the apparatus 100 as needed. For example, the system manager 132 may configure the apparatus 100 to collect a certain type of metric for a CN of the CNs 1-m, or for all of the CNs 1-m.

At block 210, the apparatus 100 may determine whether a reconfiguration request has been received (e.g., from the system manager 132).

In response to a determination that a reconfiguration request has been received, at block 212, the functions of the apparatus 100 may be reconfigured.

In response to a determination that a reconfiguration request has not been received (or further to reconfiguration of the functions at block 212), at block 214, the functions of the apparatus 100 may be executed.

At block 216, the apparatus 100 may be accessed by other agents. For example, an agent may use the memory fabric 110 to access the apparatus 100.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware, where the machine readable instructions may be executed by a processor and/or hardware.

Figure 3:
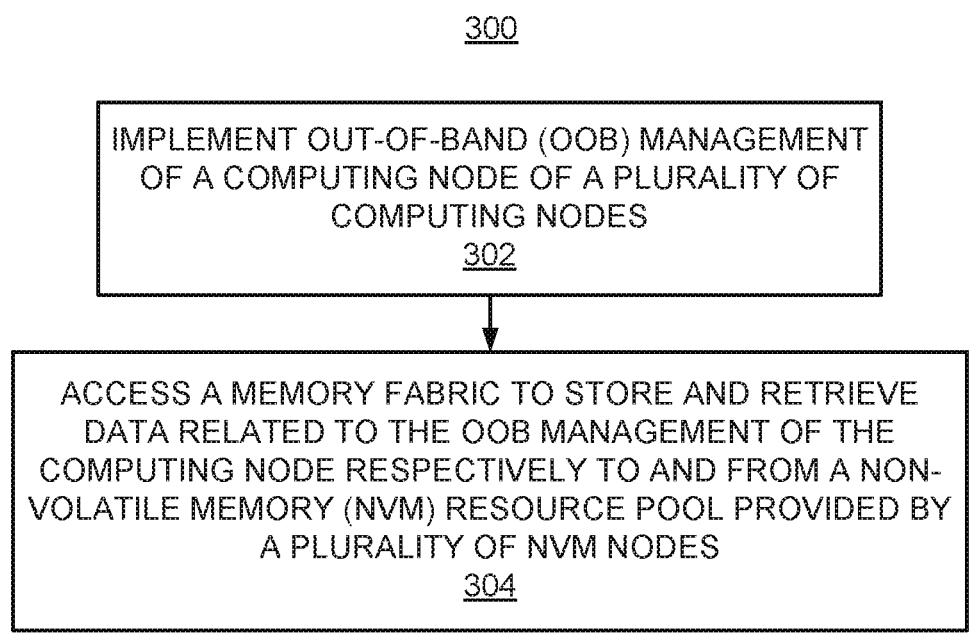
FIG. 3 illustrates a method for memory-driven OOB management, according to an example of the present disclosure.
Figure 4:
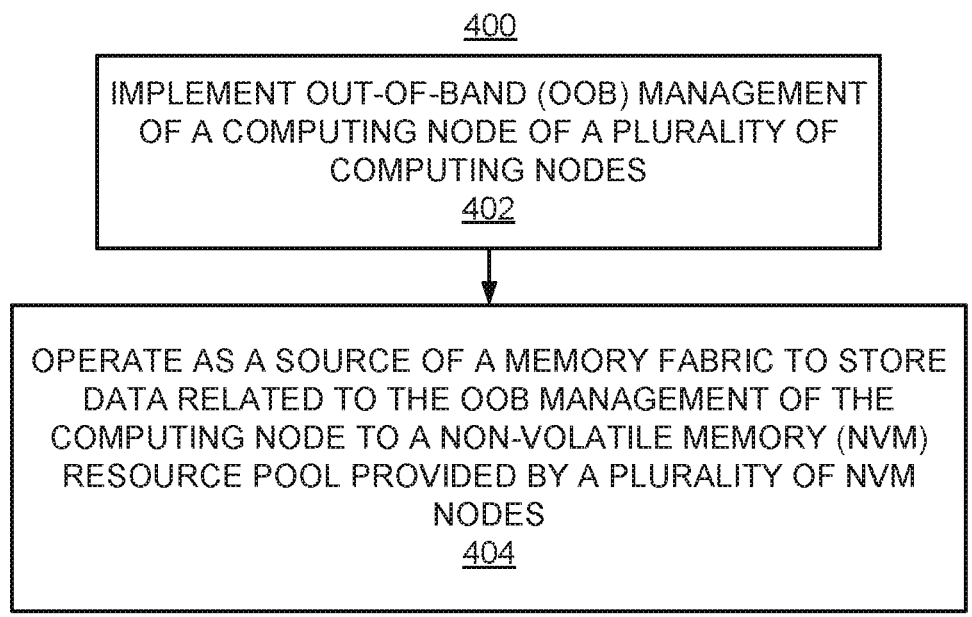
FIG. 4 illustrates further details of the method for memory-driven OOB management, according to an example of the present disclosure.

FIGS. 3-5 respectively illustrate flowcharts of methods 300, 400, and 500 for memory-driven OOB management, corresponding to the example of the memory-driven OOB management apparatus 100 whose construction is described in detail above. The methods 300, 400, and 500 may be implemented on the memory-driven OOB management apparatus 100 with reference to FIGS. 1A, 1B, and 2 by way of example and not limitation. The methods 300, 400, and 500 may be practiced in other apparatus.

Referring to FIG. 3, for the method 300, at block 302, the method may include implementing OOB management of a CN of a plurality of CNs. The OOB management of the CN may be executed independent of an OS of the CN. For example, referring to FIGS. 1A, 1B, and 2, the management module 102 may execute (i.e., perform) OOB management of the CN independent of an OS of the CN. For example, the OOB management of the CN may be executed without the support of hardware components that are needed for and used by the OS of the CN. Moreover, the OOB management may utilize resources that are dedicated to systems management and allow management of system hardware components independent of their states.

At block 304, the method may include accessing a memory fabric to store and retrieve data related to the OOB management of the CN respectively to and from a NVM resource pool provided by a plurality of NVM nodes. The memory fabric may provide for shared access to the plurality of NVM nodes by the plurality of CNs. For example, referring to FIGS. 1A, 1B, and 2, the memory access module 130 may be used to access the memory fabric 110 to store and retrieve data related to the OOB management of the CN respectively to and from a NVM resource pool provided by a plurality of NVM nodes 1-n.

According to an example, for the method 300, implementing the OOB management of the CN of the plurality of CNs may further include conducting an inventory of hardware and machine readable instructions components of the CN.

According to an example, for the method 300, implementing the OOB management of the CN of the plurality of CNs may further include determining logging information related to the CN.

According to an example, for the method 300, implementing the OOB management of the CN of the plurality of CNs may further include determining configuration information related to the CN.

According to an example, for the method 300, implementing the OOB management of the CN of the plurality of CNs may further include monitoring environment information related to the CN.

According to an example, the method 300 may further include receiving, via the memory fabric, instructions to implement a predetermined function related to the OOB management of the CN from a system manager. For example, referring to FIGS. 1A, 1B, and 2, the apparatus 100 may receive, via the memory fabric 110, instructions to implement a predetermined function related to the OOB management of the CN from the system manager 132.

According to an example, the method 300 may further include forwarding, via the memory fabric, data related to the OOB management of the CN to a system manager. For example, referring to FIGS. 1A, 1B, and 2, the apparatus 100 may forward, via the memory fabric 110, data related to the OOB management of the CN to the system manager 132.

According to an example, for the method 300, accessing the memory fabric to store and retrieve data related to the OOB management of the CN respectively to and from the NVM resource pool provided by the plurality of NVM nodes may further include utilizing a dedicated MC to access the memory fabric to store and retrieve data related to the OOB management of the CN respectively to and from the NVM resource pool provided by the plurality of NVM nodes. For example, referring to FIGS. 1A, 1B, and 2, the apparatus 100 may utilize a dedicated MC (e.g., the first CN MC 106) to access the memory fabric 110 to store and retrieve data related to the OOB management of the CN respectively to and from the NVM resource pool provided by the plurality of NVM nodes 1-n.

According to an example, the method 300 may further include utilizing a further dedicated MC to access the memory fabric to store and retrieve further data related to the CN respectively to and from the NVM resource pool provided by the plurality of NVM nodes. For example, referring to FIGS. 1A, 1B, and 2, the CN may utilize a further dedicated MC (e.g., the second CN MC 124) to access the memory fabric 110 to store and retrieve further data related to the CN respectively to and from the NVM resource pool provided by the plurality of NVM nodes 1-n.

Referring to FIG. 4, for the method 400, at block 402, the method may include implementing OOB management of a CN of a plurality of CNs. The OOB management of the CN may be executed independent of an OS of the CN. For example, referring to FIGS. 1A, 1B, and 2, the management module 102 may execute OOB management of the CN independent of an OS of the CN.

At block 404, the method may include operating as a source of a memory fabric to store data related to the OOB management of the CN to a NVM resource pool provided by a plurality of NVM nodes. The memory fabric may provide for shared access to the plurality of NVM nodes by the plurality of CNs.

The NVM nodes may be implemented in a fault zone that is different from the plurality of CNs. For example, referring to FIGS. 1A, 1B, and 2, the apparatus 100 may operate as a source of the memory fabric 110 to store data related to the OOB management of the CN to a NVM resource pool provided by the plurality of NVM nodes 1-n.

According to an example, the method 400 may further include implementing the OOB management of the plurality of CNs by performing OOB management functions related to the plurality of CNs at the CN.

According to an example, the method 400 may further include assigning, to an OOB management apparatus (e.g., the apparatus 100) of the CN, a block of NVM from the NVM resource pool upon receipt of a request from the CN.

Referring to FIG. 5, for the method 500, at block 502, the method may include receiving, from a system manager, configuration information related to OOB management of a CN of a plurality of CNs. The OOB management of the CN may be executed independent of an OS of the CN. For example, referring to FIGS. 1A, 1B, and 2, the apparatus 100 may receive, from the system manager 132, configuration information related to OOB management of a CN of a plurality of CNs 1-m.

At block 504, the method may include implementing the OOB management of the CN based on the configuration information. For example, referring to FIGS. 1A, 1B, and 2, the apparatus 100 may implement the 00B management of the CN based on the configuration information.

At block 506, the method may include accessing a memory fabric to store and retrieve data related to the OOB management of the CN respectively to and from a NVM resource pool provided by a plurality of NVM nodes. The memory fabric may provide for shared access to the plurality of NVM nodes by the plurality of CNs. For example, referring to FIGS. 1A, 1B, and 2, the apparatus 100 may access the memory fabric 110 to store and retrieve data related to the 00B management of the CN respectively to and from a NVM resource pool provided by a plurality of NVM nodes 1-n.

According to an example, the method 500 may further include bypassing a CPU of the CN to access the NVM resource pool provided by the plurality of NVM nodes.

According to an example, receiving, from the system manager, configuration information related to the OOB management of the CN of the plurality of CNs may further include receiving, from the system manager, configuration information related to collection of a predetermined metric for the CN of the plurality of CNs.

Figure 6:
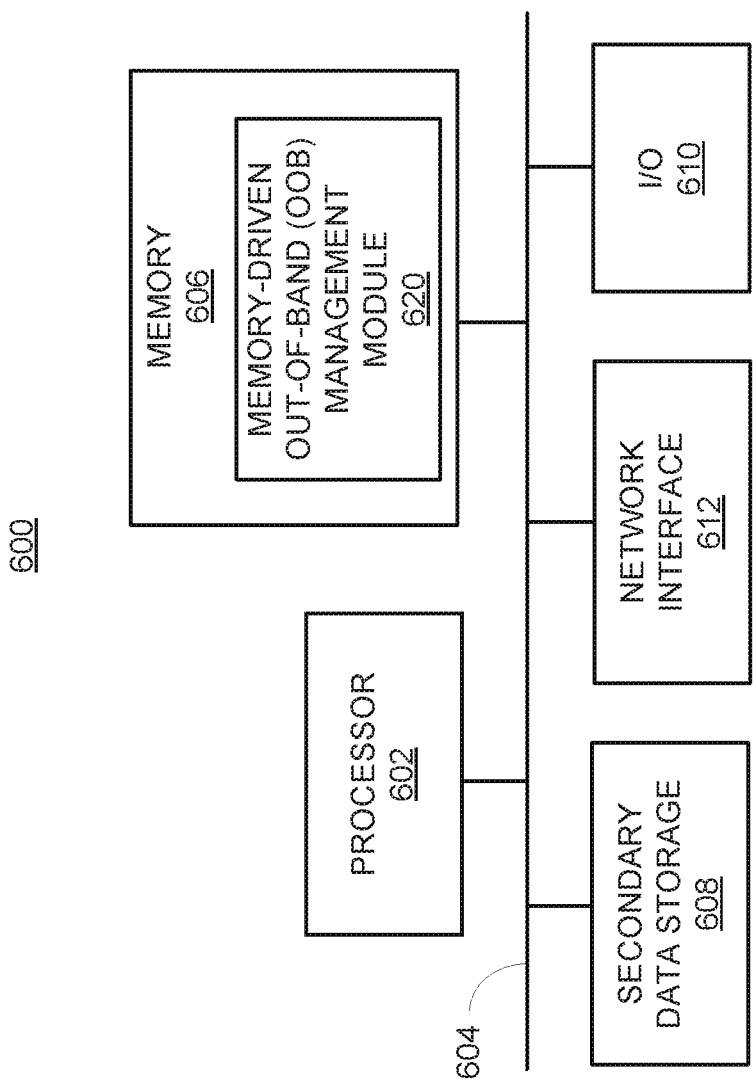
FIG. 6 illustrates a computer system, according to an example of the present disclosure.

FIG. 6 shows a computer system 600 that may be used with the examples described herein. The computer system 600 may represent a generic platform that includes components that may be in a server or another computer system. The computer system 600 may be used as a platform for the apparatus 100. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a memory-driven OOB management module 620 including machine readable instructions residing in the memory 606 during runtime and executed by the processor 602. The memory-driven OOB management module 620 may include the modules of the apparatus 100 shown in FIG. 1A.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for memory-driven out-of-band (OOB) management, the method comprising:
    implementing, by a processor, an OOB management on a first computing node of a plurality of computing nodes, wherein the processor used to implement the OOB management on the first computing node is independent from resources used to run an operating system (OS) of the first computing node;
    assigning, by the processor, a memory address to the OOB management on the first computing node to enable the OOB management on the first computing node to operate as a destination of memory read or write operations by other computing nodes of the plurality of computing nodes via a memory fabric, wherein the memory fabric is a fabric via which the plurality of computing nodes is connected to a plurality of non-volatile memory (NVM) nodes for storing and retrieving data;

collecting, by the processor of the first computing node, data related to the OOB management from a sensor device on the first computing node; and forwarding, by the processor of the first computing node, the collected data from the first computing node to a system manager, which is separate and independent from the NVM nodes, via the memory fabric using the memory address assigned to the OOB management.

2. The method of claim 1, wherein implementing the OOB management on the first computing node of the plurality of computing nodes further comprises:

conducting an inventory of hardware components and an inventory of machine readable instructions components of the plurality of computing nodes.

3. The method of claim 1, wherein implementing the OOB management on the first computing node of the plurality of computing nodes further comprises:

determining logging information from the plurality of computing nodes.

4. The method of claim 1, wherein implementing the OOB management on the first computing node of the plurality of computing nodes further comprises:

determining configuration information of the plurality of computing nodes.

5. The method of claim 1, wherein implementing the OOB management on the first computing node of the plurality of computing nodes further comprises:

monitoring environment information related to each of the plurality of computing nodes.

6. The method of claim 1, further comprising:

receiving, via the memory fabric, instructions to implement a predetermined function related to the OOB management implemented on the first computing node from the system manager.

7. The method of claim 1, further comprising:

forwarding, via the memory fabric, data related to the OOB management from the first computing node to the system manager.

8. The method of claim 1, further comprising:

assigning, by the processor, memory blocks of the NVM nodes to each of the plurality of computing nodes, wherein the assigned memory blocks of the NVM nodes are accessible only via the memory fabric; and accessing the memory fabric to store the collected data related to the OOB management in the assigned memory blocks of the plurality of NVM nodes.

9. The method of claim 8, further comprising:

utilizing a dedicated memory controller to access the memory fabric to retrieve data stored in the assigned memory blocks of the plurality of NVM nodes.

10. The method of claim 1, wherein collecting data related to the OOB management from the sensor device comprises:

collecting temperature measurements detected by temperature sensors located at the first computing node.

11. A memory-driven out-of-band (OOB) management apparatus comprising:

a processor; and a memory storing machine readable instructions that when executed by the processor cause the processor to:

implement an OOB management on a first computing node of a plurality of computing nodes, wherein the processor used to implement the OOB management on the first computing node is independent from resources used to operate an operating system (OS) of the first computing node;

assign a memory address to the OOB management on the first computing node to enable the OOB management on the first computing node to operate as a destination of a memory fabric, wherein the memory fabric is a fabric via which the plurality of computing nodes is connected to a plurality of non-volatile memory (NVM) nodes for storing and retrieving data;

collect, at the first computing node, data related to the OOB management from a sensor device on the first computing node; and forward the collected data from the first computing node to a system manager, which is separate and independent from the NVM nodes, via the memory fabric using the memory address assigned to the OOB management.

12. The memory-driven OOB management apparatus according to claim 11, further comprising machine readable instructions to:

implement the OOB management on the first computing node of the plurality of computing nodes by performing OOB management functions related to the plurality of computing nodes at the first computing node.

13. The memory-driven OOB management apparatus according to claim 11, wherein the machine readable instructions are executable to cause the processor to:

assign memory blocks of the plurality of NVM nodes to each of the plurality of computing nodes upon receipt of a request from the computing node.

14. The memory-driven OOB management apparatus according to claim 11, wherein the machine readable instructions to collect data related to the OOB management from the sensor device comprise machine readable instructions to:

collect temperature measurements detected by temperature sensors located at the first computing node.

15. A non-transitory computer readable medium having stored thereon machine readable instructions to provide memory-driven out-of-band (OOB) management, the machine readable instructions, when executed, cause a processor to:

receive, from a system manager, configuration information related to OOB management of a first computing node of a plurality of computing nodes, wherein the OOB management of the first computing node is executed independently of an operating system (OS) of the first computing node;

implement the OOB management on the first computing node based on the configuration information;

assign a memory address to the OOB management on the first computing node to enable the OOB management on the first computing node to operate as a destination of a memory fabric, wherein the memory fabric is a fabric via which the plurality of computing nodes is connected to a plurality of non-volatile memory (NVM) nodes for storing and retrieving data;

collect, at the first computing node, data related to the OOB management from a sensor device on the first computing node; and forward the collected data from the first computing node to the system manager, which is separate and independent from the NVM nodes, via the memory fabric using the memory address assigned to the OOB management.

16. The non-transitory computer readable medium according to claim 15, further comprising machine readable instructions to:

assign memory blocks of the NVM nodes to each of the plurality of computing nodes, wherein the assigned memory blocks of the NVM nodes are accessible only via the memory fabric; and bypass a central processing unit (CPU) of the first computing node to access the assigned memory blocks of the plurality of NVM nodes.

17. The non-transitory computer readable medium according to claim 15, wherein the machine readable instructions to collect data related to the OOB management from the sensor device comprise machine readable instructions to:

collect temperature measurements detected by temperature sensors located at the first computing node.

* * * * *